United States Patent [19]
Cuff

[11] 3,792,950
[45] Feb. 19, 1974

[54] PELLETIZING APPARATUS

[75] Inventor: David W. Cuff, Chepachet, R.I.

[73] Assignee: Cumberland Engineering Company, Inc., Attleboro, Mass.

[22] Filed: Sept. 8, 1972

[21] Appl. No.: 287,276

[52] U.S. Cl................ 425/313, 425/378, 425/464
[51] Int. Cl................................................ B29f 3/08
[58] Field of Search ... 425/313, 314, 378, 379, 464; 264/141

[56] References Cited
UNITED STATES PATENTS

| | | | |
|---|---|---|---|
| 2,307,034 | 1/1943 | Gaenzle | 425/378 X |
| 2,443,289 | 6/1948 | Bailey | 425/379 X |
| 3,069,727 | 12/1962 | Shranek | 425/379 X |
| 3,070,835 | 1/1963 | Alsys | 425/113 X |
| 3,168,058 | 2/1965 | Cunningham | 425/314 X |

*Primary Examiner*—R. Spencer Annear
*Attorney, Agent, or Firm*—Albert P. Davis; Burnett W. Norton

[57] ABSTRACT

Apparatus for pelletizing synthetic plastic resins, comprising an extruding die assembly having extrusion orifice sleeves pervious to liquid, a water jacket surrounding each sleeve in such manner that water will pass through the walls thereof to chill plastic being extruded therethrough while at the same time lubricating passage of the plastic therethrough. Severing means are provided at the die face for cutting the plastic into pellets as it is extruded. Optionally means are provided for collecting the pellets such as a casing that surrounds the die and the cutting means.

22 Claims, 12 Drawing Figures

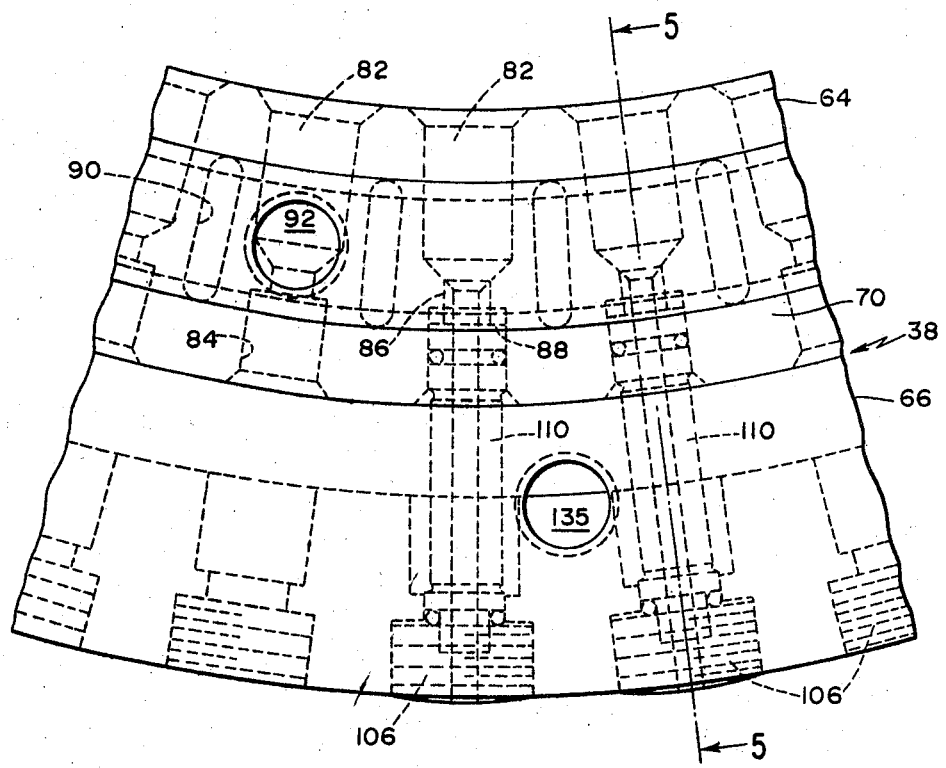
FIG. 4
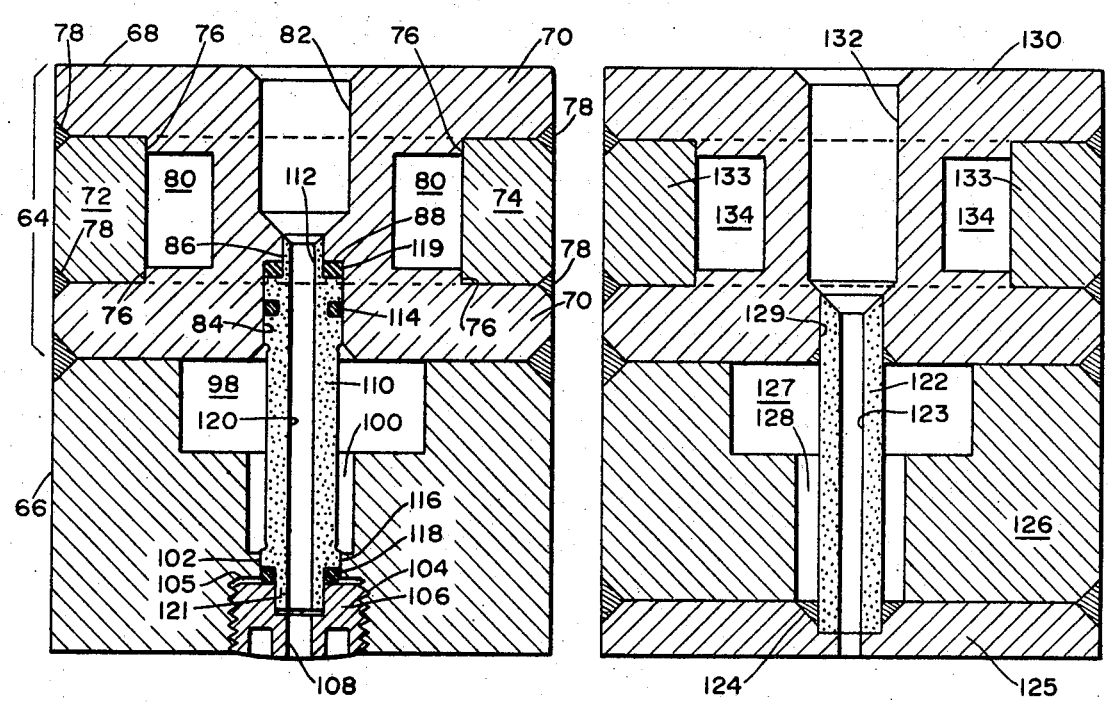
FIG. 5
FIG. 6

PELLETIZING APPARATUS

BACKGROUND OF THE INVENTION

In the plastic molding industry, there is a large demand for pellets of synthetic plastics of the thermoplastic type. In many of such machines, an extrusion die is used having a plurality of orifices through which the plastic while hot is extruded. As the extruded plastic emerges from the die face, one or more moving knives cut the emerging plastic into small pellets. In some of these machines, the plastic is extruded into a fluid bath (generally water) to solidify the plastic as it emerges from the die orifices and thus facilitate cutting by the knives. The water bath may also be used as a means to extract the pellets from the casing which surrounds both extrusion die and the cutting knives.

One of the difficulties encountered in the prior art machines is that, regardless of whether the die face is curved (such as cylindrical) or flat, as the plastics emerge from the die orifices and the knife passes over them to cut the pellets, the plastic has a tendency to smear under the knife. The result is that in a short time, sufficient plastic has been built up on the die face to require the stopping of the machine in order to clean off the die face. This smearing action is a minimum for some plastics, but on plastics such as polyurethane and polypropylene, the smearing takes place very rapidly and thus the down-time of such machines may be excessive.

Accordingly, one of the unsolved problems in the prior art is to obtain a machine which will make pellets from all kinds of thermoplastics without the smearing effect.

Another difficulty with the prior art machines is that in order to make clean cuts, the knives are pressed against the die face by spring means or by a direct mechanical fastening, so that the knife edge bears with considerable pressure against the die face. As a result, wear occurs, both on the knife and the die face which requires rather expensive regrinding and down time of the machine.

SUMMARY OF THE INVENTION

Accordingly, it is the general purpose of this invention to provide solutions to the above problems by providing an extrusion die apparatus and the dies therefor for making pellets from synthetic thermoplastics without the above smearing, and which therefore minimizes the down time of the machine; and of providing an extrusion type apparatus and die therefor which has a reduced amount of wear, thus again to minimize the down time of the machine. In addition, the invention includes what is deemed to be a novel method of extruding materials for the above purposes.

Accordingly, among the several objects of the invention may be noted the provision of apparatus for making pellets from thermoplastic material which is so constructed as to minimize the build up of plastic material at the extrusion orifices beneath the die face and the cutting knife.

Another object of the invention is the provision of a machine for making pellets from thermoplastic material, in which the wear of the die face caused by the cutting knife has been practically eliminated.

A still further object of the invention is to provide apparatus for making pellets from synthetic thermoplastic material in which, as the plastic material is being extruded through the die orifice, the material is cooled while within the orifice and simultaneously lubricated to assist its passage therethrough.

Another object of the invention is the provision of apparatus of any of the kind which has the desired features of reduced cost of manufacture and of operation, as well as reduced maintenance, while maintaining a high output of material from the apparatus.

Another object of the invention is the provision of methods for making pellets of thermoplastic synthetic resins, in which the material, while being fed through an extrusion orifice is both chilled while in the orifice and lubricated in its passage therethrough.

Other objects and advantages will be in part pointed out hereinafter, and in part obvious.

Accordingly, the invention comprises the elements and combinations of elements, arrangements of parts, and features of construction of the apparatus, as well as steps and sequence of steps and features of operation of the methods, all of which will be exemplified in the structures and in the methods hereinafter described, and the scope of the application of which will be indicated in the appended claims.

In the accompanying drawings, in which several of possible embodiments of the invention are illustrated:

FIG. 4 is a cross-sectional view of a portion of one embodiment of an extrusion die which is an invention and which forms part of the die assembly of FIGS. 1 and 2;

FIG. 5 is an enlarged view showing in greater detail a single die orifice of FIG. 4, taken in the direction of sight lines 5—5 on FIG. 3;

FIG. 6 is a view similar to FIG. 5, but showing another embodiment of the die orifice of this invention;

Throughout the drawings, like parts will be designated by like reference numerals. Dimensions of certain of the parts as shown in the drawings may have been modified and/or exaggerated for the purposes of clarity of illustration and understanding the invention.

Figure 1:
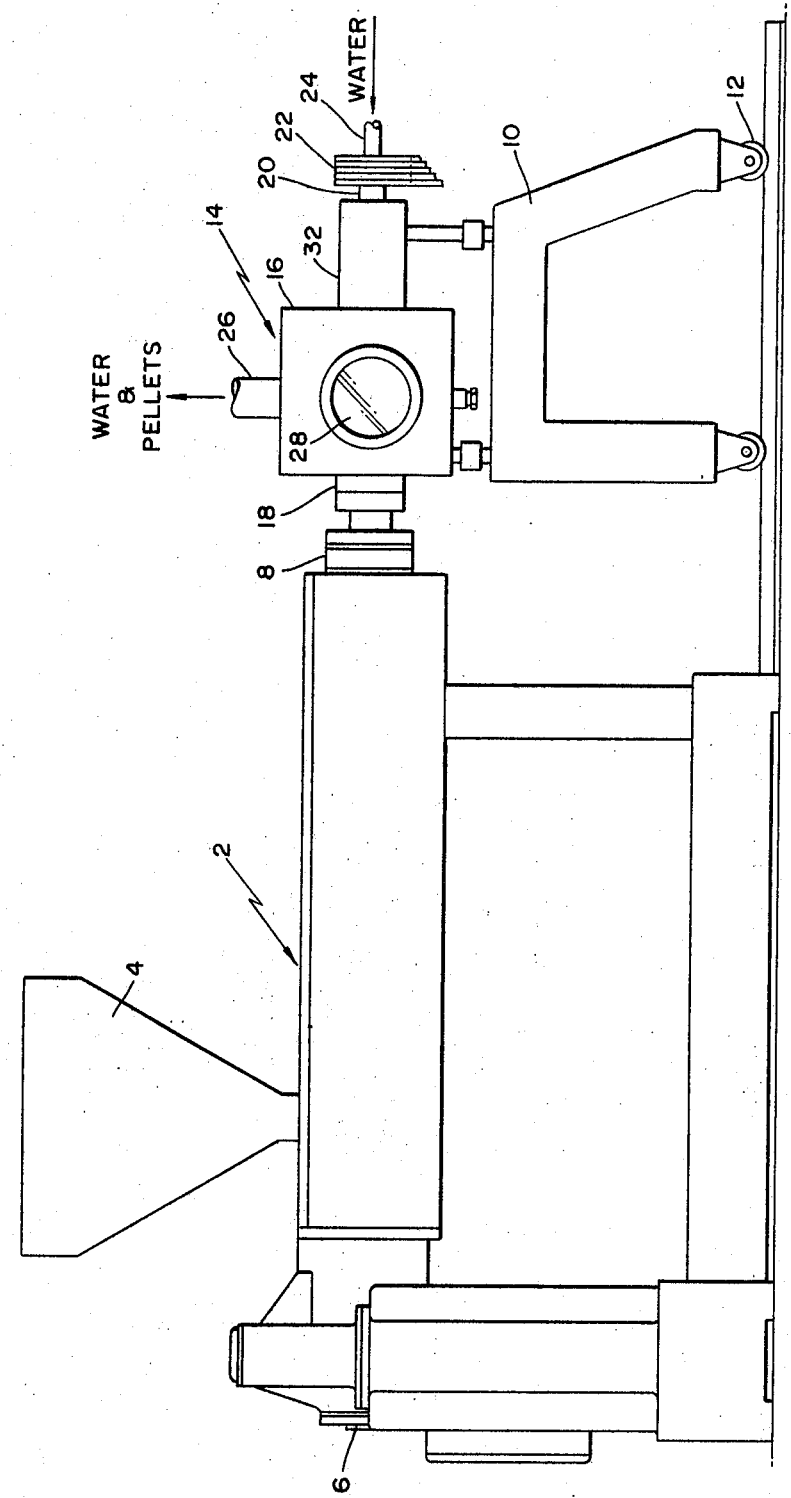
FIG. 1 is a generalized view showing one embodiment of the apparatus of the present invention coupled to a conventional machine for mixing and extruding synthetic thermoplastic materials.

Referring now to FIG. 1, there is shown a combination of elements as follows, the view showing a workable assembly of parts, some of which are well known and others of which are new and fall within the purview of this invention.

A conventional extruder indicated generally by numeral 2 is shown having the feed hopper 4, the drive mechanism 6 for the extruder screw, and an outlet end 8. These parts are all conventional, and are not part of this invention.

Mounted on a base 10, which is shown on suitable rollers 12 for ease of moving the assembled structure, is one embodiment of the apparatus of this invention indicated generally by numeral 14 and comprising a casing 16, means 18 for coupling the casing to the outlet 8 of extruder 2, a drive shaft 20 extending into the interior of casing 16, a pulley 22 mounted on the drive shaft for coupling the latter to an electric motor (not shown), a pipe 24 in the shaft 20 for feeding water into the interior of the casing, and an outlet 26 through which water is forced out of the casing carrying with it cut pellets. A sealed port of heavy glass 28 is provided in both sides of the casing 16 in order to see what is taking place therewithin.

Figure 2:
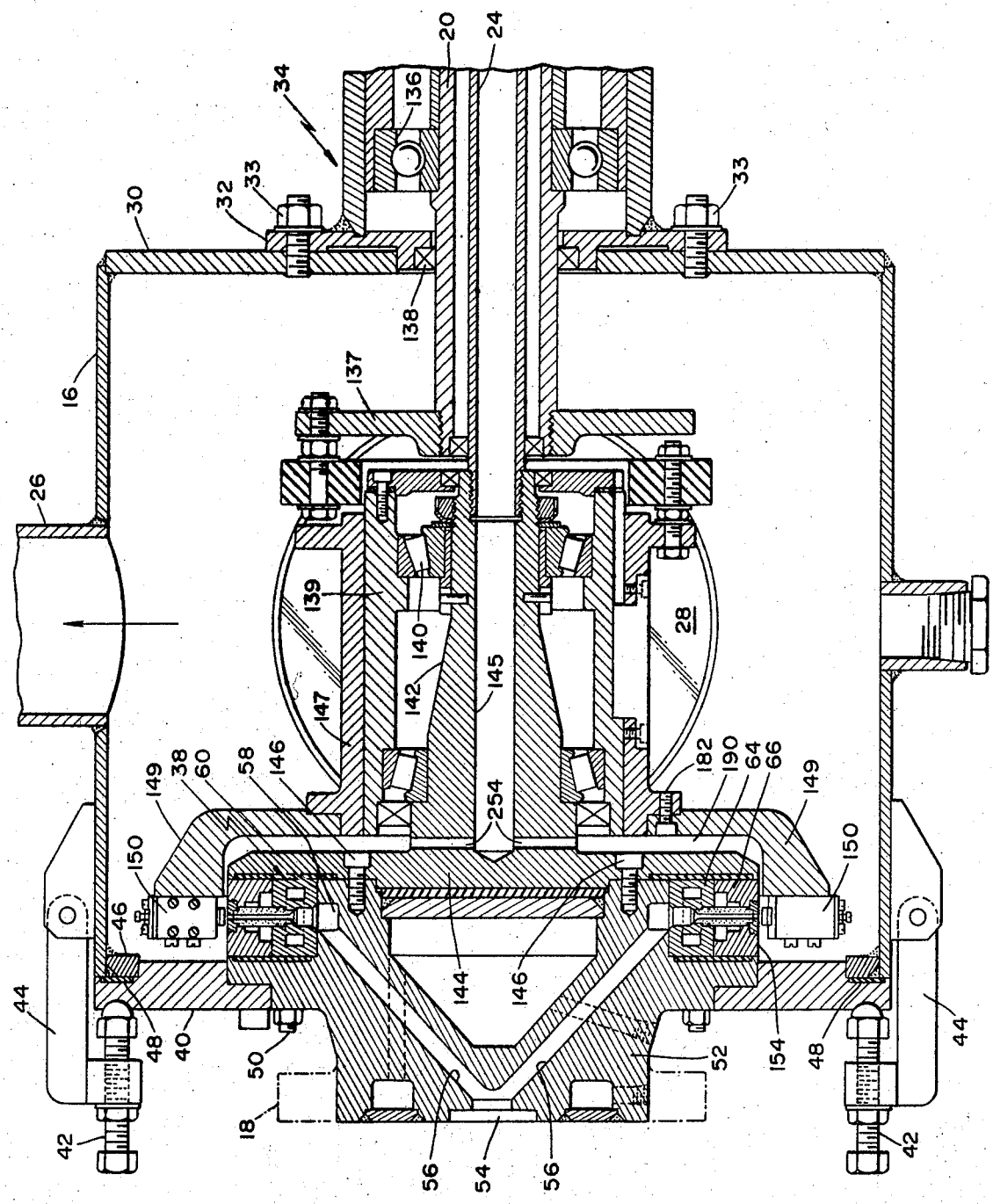
FIG. 2 is a sectional elevation of the FIG. 1 embodiment.

Referring now to FIG. 2, there is shown partly in cross-section, the casing 16 and the elements therewithin. One end of the casing is closed by means of a plate 30 welded to the case perimeter and to which is removably fastened by bolts 33 a plate 32 which holds a bearing and water sealing mechanism indicated generally by numeral 34, the bearings 136 rotatably supporting the drive shaft 20.

At the other end of the casing 16 is the die assembly of this invention indicated generally by numeral 38, mounting being as follows: A mounting plate 40 is fastened against the left-hand end of casing 16 by means of clamping studs 42 whose supports 44 are pivoted to the casing. In order to supply a suitable bearing surface for the plate 40, a steel ring 46 is welded around the inner end of the casing 16 against which the plate 40 is firmly held by means of the bolts 42, suitable sealing means 48 being provided.

fastened to the mounting plate 40 by means of bolts (not shown) in conventional manner is a coupling or adaptor 52 having at the left-hand end thereof the coupling means 18 by which the adaptor is fastened to the outlet 8 of the extruder 2. The adaptor has an entrance opening 54 which communicates with the extruder orifice when the parts are clamped together. This clamping means may also structurally support the adaptor 52 and die assembly 38 when the casing 16 is disengaged from plate 40 for access into the interior thereof and to die face 154. A plurality of interior bores or conduits 56 are provided in the adaptor, each of which communicates at its one end with the opening 54, and at its other end with a manifold 58 which is provided in a cylindrical surface 60 provided on the adaptor. The cylindrical extrusion die 38 which is in the shape of a torus is mounted by a slidable fit onto the cylindrical surface 60 of the die body, mounting being by conventional means such as bolts 50 which pass through the die body and thread into die ring 64.

The extrusion die 38 in this embodiment is, as indicated above, a torus which fits onto the cylindrical surfaces 60. It is comprised of the inner and outer rings 64 and 66 which fit upon each other and which (see FIG. 5) are welded together. The inner die ring 64 is composite, and comprises a ring 68 whose cross-section is spool-shaped and has flanges 70, together with the outer annuli 72 and 74 which fit within the flanges 70. Shoulders 76 are provided so that when annuli 72, 74 are welded in place, as at edges 78 (see FIG. 5), manifold channels 80 are formed to receive die heating oil. A plurality of radially extending extrusion bores 82 are provided spaced around the composite die ring 64. Bores 84 are provided which are coaxial with and contiguous with the bores 82. Bores 82 and 84 communicate with each other by means of a short bore 86 of reduced diameter which has a shoulder 88.

It will be observed that the channels 80 lie on each side of the entering bores 82 of the extrusion die. The channels 80 are inter-connected between the bores by a plurality of cross channels 90. See FIGS. 3 and 4.

An inlet 92 (see FIGS. 3 and 4) is provided for one of the manifolds 80 and an outlet 94 for the other. Suitable baffles may be placed in these manifolds to direct the heating fluid back and forth from one channel to the other for even heating. By means of the inlet and outlet, heating oil is conducted through manifolds or channels 80 to maintain the inner portions of the bores 82 heated, thus keeping the plastic entering these bores hot while therein.

The outer ring of the extrusion die proper is provided with an inner peripheral groove which when ring 66 is positioned on ring 64 and welded thereto, forms a manifold 98. Extending radially from manifold 98 are bores 100 each of which is aligned axially with one of the bores 84 in the inner die ring 64. Each of the bores 100 is provided with a reduced diameter portion 102 and an enlarged end portion 104 which is threaded to receive a plug 106. A shoulder 105 is provided, and each of plugs 106 is provided with a central bore 108 axially aligned with its respective bore 104, and can seat on shoulder 105.

Inserted in each of the composite bores (as shown in FIGS. 4 and 5) is a metallic sleeve 110 which is pervious to fluid, and having central bore 120. The sleeve, in its preferred embodiment, is a sintered material of open cell construction, the cell pores being (for example) in the order of 20 microns diameter. It is pointed out that the pore size can be changed, but the 20 micron pore size has been found to work satisfactorily. The sleeves 110 preferably made of type 316 stainless steel, but other comparable materials may be used.

Each of the sleeves 110 has the neck 112 which is a sliding fit in the short bores 86, and an O-ring sealing member 114 (or other suitable sealing means) is provided which seals the neck 112 as to the surface of bore 84. At the other end of the bushing or sleeve 110 there is provided a portion 116 which is a sliding fit in the bore 102, and an O-ring sealing member 118 is provided. At the upper end (as viewed in FIG. 5) there is provided a gasket or sealing washer 119 which surrounds the neck 112 and bears against the shoulder 88. It will be observed that the bottom end (as viewed in FIG. 5) of the sleeve 110 is provided with the neck 121 of reduced diameter which enters a suitably enlarged portion of the bore of plug 106. When plug 106 is screwed into place and bears against shoulder 105 and the O-ring 118, it forces the sleeve 110 against the gasket 119 and expands O-ring 118, thus sealing the entire structure together.

It is to be noted that the manifold 98 as well as the individual bores 100 surround each of the sleeves 110.

It is thus to be noted that once the molten plastic has entered the entering bore 82, thereafter the sleeves 110 with the bores 120 become the extrusion dies proper, the sleeves receiving hot plastic from their associated inlet bores 82.

The preferred embodiment of the invention is shown in FIG. 5, to the extent that if a sleeve 110 should become plugged, then all that is necessary in order to replace the sleeve is to remove the respective plug 106, withdraw the sleeve and insert a replacement therefor.

In the event that it is desired to make a simplified form of composite die ring, a non-insertable type is shown in FIG. 6, in which there is shown one of a plurality of pervious sleeves or bushings 122, each sleeve having bore 123 and being permanently brazed at the outer end into a suitable recess 124 provided in the inner face of a cylindrical ring 125 surrounding the outer die ring 126. As in the FIG. 5 embodiment, a water manifold 127 and individual bores 128 surround sleeves 122 as in FIG. 5. The upper ends of the sleeves are brazed into sutable bores 129 provided in the torus 130, which is somewhat like torus 68, the bores 129 communicating with inlet bores 132. The inlet die ring comprises the torus 130 and the annuli 133 to provide heating manifolds 134.

After the cylindrical ring 125, torus 126, torus 130 and annuli 133 are welded together, the sleeves 122 are inserted with properly located brazing compound, and brazing is done in a furnace.

Into the manifolds 98 and 127 (i.e., in both embodiments) there is provided the inlet 135, the purpose of which is to provide a fluid under high pressure which will pass through the sleeves or bushings 110 or 122 and into the interior bores 120 or 123 thereof. In view of the fact that the egress from the channel is to be through the sleeves 110 or 122, no exit nipple or connection for the channels 98 is necessary.

Referring to FIG. 2, fixedly mounted on the inner end of the shaft 20, the latter being supported conventionally by the bearings 136 plus whatever additional bearings are necessary is the drive plate or coupling plate 137. It will be noted that the mounting plate 32 also contains the water tight seal 138 for the shaft. A sleeve 139 is provided which is supported on bearings 140, the inner races thereof being mounted on the stationary bearing member 142 which is anchored on the adaptor 52 as indicated. Anchoring is done by means of the support plate 144 which is mounted on the right-hand face of the adaptor by means of the bolts 146, the plate overlapping and sealing the die 38 in place. Sleeve 139 is provided with a bore 145 which communicates with pipe 24.

Mounted on sleeve 139 is driven sleeve 147 which is fixed thereon by suitable means such as set screws and key. Plate 137 is attached to sleeve 147 as shown using conventional means. Attached to the inner (or left-hand end as shown) of the sleeve 147 is a knife support plate 149 on which, near the upper edge thereof, are mounted knife holders 150. The knife plate itself is attached to the drive sleeve 147 in conventional manner by means of the shoulders indicated in FIG. 2, and the mounting screws or bolts 182.

Referring now to FIGS. 7–10, there is shown in detail the knife holders and the knives. The die face 154 of the outer die ring 66 is shown in part, and one of the knife holders 150 attached thereto.

Each knife holder 150 comprises a body 156 which is provided with the channel 158 adapted to receive in sliding relationship the body portion 160 of a cutting knife. A clamping member 162 is provided which bears against the body in order to lock it securely in the body 156 and hold it in adjusted position. Clamping member is forced against body 156 by means of the bolts 164 in customary manner. At the rear end of the body portion 160 is provided a plate 166 fastened to the body by means of the bolts 168, the function of the plate being to support adjusting screw 170 with its lock nut 172. By means of the latter construction, the knife is securely adjusted in its proper relationship to the die face 154.

Each of the knives is provided with the cutting edge 174, and it will be noted that the cutting edge does not make contact with the die face 154. The reason why this is not necessary will be explained below. However, at this point it is to be noted that because the knife edge does not make engagement with the die face, there is no wear caused by the blade on the die face 154. The gap between the knife edge and the die face may be, for example 0.002 to 0.004 inches.

If desired, a channel 176 may be provided in the body 160 of the knife which cooperates with the outstanding shoulder 178 on the pressure plate 162 to assist in safely holding the knife within the holder 150.

Figure 3:
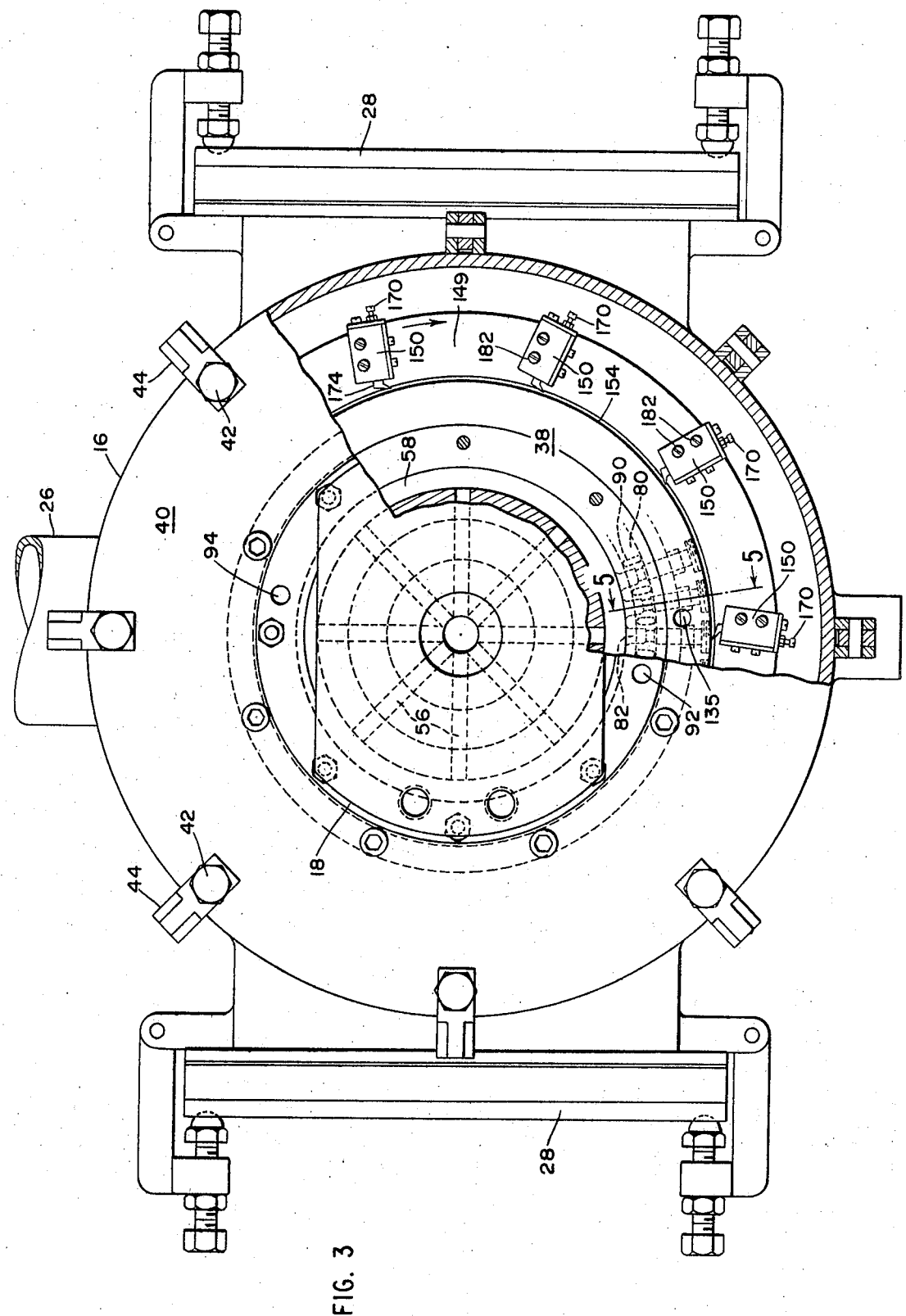
FIG. 3 is an end elevation, partly in section, of the FIG. 1 embodiment.
Figure 7:
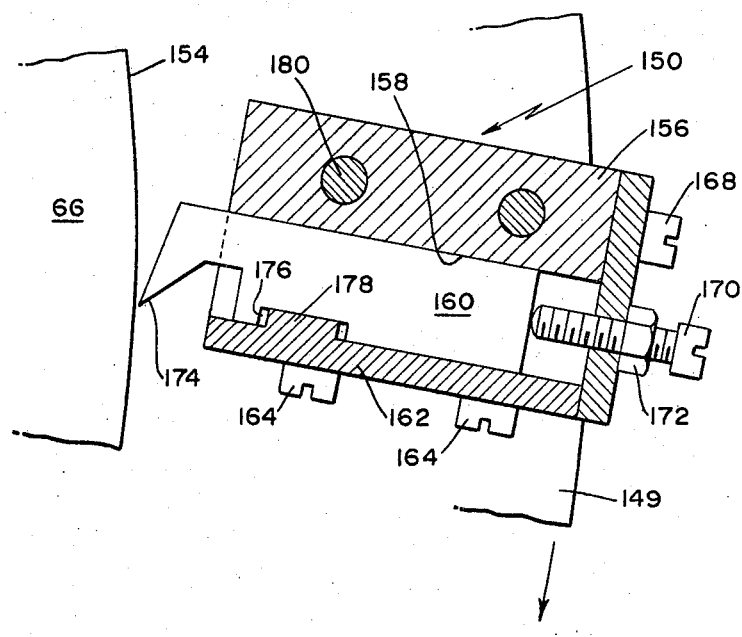
FIG. 7 is a view showing a cutting knife arrangement for this invention.
Figure 8:
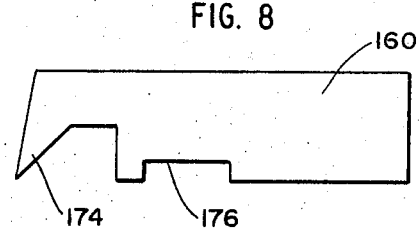
FIG. 8, 9 and 10 are views showing the cutting knife utilized in FIG. 4.
Figure 9:
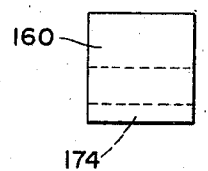
Figure 10:
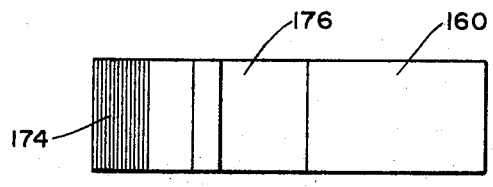

As shown, see FIG. 3, a plurality of knives is provided. The number of knives is not critical, and six to 12 can be used, as examples. Each of these knives is mounted on the perimeter of the knife plate 149 by means of bolts, for example, 180.

In the operation of the apparatus thus shown and described, it will be noted that the manifolds 80 are used to heat the entering portion of the die orifices, that is, the bores 82. To this end, hot oil or other suitable heating medium is forced through these manifolds or channels to supply continuous heat thereto and thus to a portion of each die orifice which is adjacent thereto. By this means, the plastic entering the composite orifice of the die ring is maintained in a heated condition.

However, and this is quite contrary to the teaching of the art, after the plastic being extruded has progressed within the sleeves or tubes 110 or 122, it therein encounters a cooling liquid, preferably, which is within the sleeve bores. Water is supplied to the manifolds 98 or 127 (and thus to counter bores 100 or 128) at approximately 800 lbs. per square inch pressure, and as a result of the pressure and the permeability of the sleeves 110 or 122 to water, the water is forced through the sleeve wall and into the bores 120 and 123 of the respective sleeves. Assuming that plastic is already in these sleeves in the hot condition, most of the water immediately evaporates (the system being hydraulically open). A considerable amount of heat is withdrawn from the plastic due to the heat of evaporation of the water. As a result of this, at least the surface of the plastic becomes solidified. In addition, the cooling fluid (water for example) is constantly being forced under pressure through the walls of the sleeves with the result that a continuous film of water surrounds the interior surface of the bores of each extrusion sleeve 110 or 122. This film of water acts as a lubricant for the cylindrical rod of plastic which is being forced through the extrusion sleeve by the pressure of the heated plastic in the bore 82. As a result of this combined action, it is believed, the plastic does not freeze in the die orifice and it emerges therefrom in the form of a plastic cylinder having a solidified outer wall. When it emerges, one of the knives 174 encounters the plastic cylinder and immediately shears it off. No smearing of the die face 154 takes place, with the result that no plastic is built up thereon.

Furthermore, pelletization takes place successfully even though the knife does not contact the die face. The result is that no wear takes place on the die face or, for that matter, on the knife edge itself because of any contact against the die face. If wear takes place against the knife, it is solely due to the abrasive action of some plastics, but not otherwise.

The above explanation of what happens in the die orifice sleeves 110 or 122 is what is believed to take place. However, there may be other more accurate explanations for what happens, and applicant does not wish to be bound in the description of the invention by the above explanation of what is believed to take place.

In order to remove the pellets from the casing 16 as they are cut off at the die face by means of the revolving knives 150, water is forced through the entrance pipe 24 and thence through bore 145, from which it flows through holes 254 in member 142 and through suitable spacings 190 between the knife supporting plate 149 and the bearing support plate 144. Water flows across the cylindrical face 154 of the extrusion die proper and in so doing carries the pellets, as they are cut, away from the path of the respective knives. The pellets then enter the chamber formed by the casing 16, and are carried therefrom by the flow of water out the exit tubing 26. From tubing 26 the pellets and water go into a suitable separation device where the pellets and water are separated, the pellets being collected by separate means (not shown) and the water being recycled through casing 16.

In respect to the permeability of the bushings or sleeves 110 or 122, tests have been run successfully with the sleeves being made of Type 316 stainless steel, witth the porosity of the sleeves being in the order of 20 microns. The tests were successful with a water pressure of 800 lbs. per square inch. Of course, it is possible to change the permeability of the sleeves, for example, to either ten microns or five microns, but the pressure required to obtain the sufficient in-flow of water will be raised. Such other parameters are well within the realm of the person skilled in the art in view of the teaching of this invention.

In regard to the lubricating film, it is believed that this is probably a mixture of water and steam but this is not certain. The fact that chilling takes place is well indicated by the fact that on examination, it is observed that the plastic cylinder, as it emerges from the respective extrusion orifices or sleeves in this invention comprises a stiffened crust of chilled plastic and an inner soft core. It is believed that the presence of the firm surface is what enables one to use a knife edge which is separated from the die face, and which also prevents smearing of the plastic.

In the machines which have been constructed and which have operated successfully, the diameter of the bores 120 and 123 have been in the order of magnitude of 0.110 inches inside diameter and approximately 1 inch long.

It is also to be noted that during operation of the apparatus, shrinkage and distortion of a material such as polypropylene is minimized, and the pellets are more uniform in configuraiton.

Figure 12:
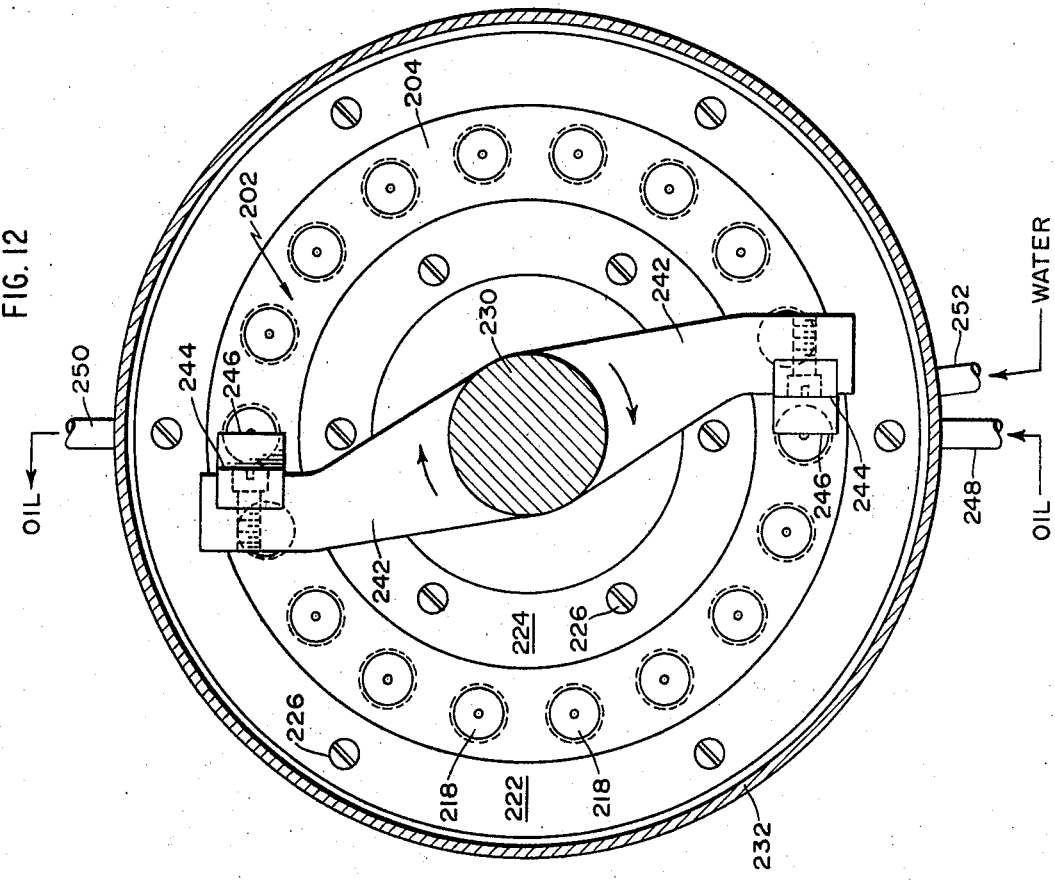
FIG. 12 is an end view of the FIG. 11 embodiment, taken in the direction of sight lines 12—12 thereon.
Figure 11:
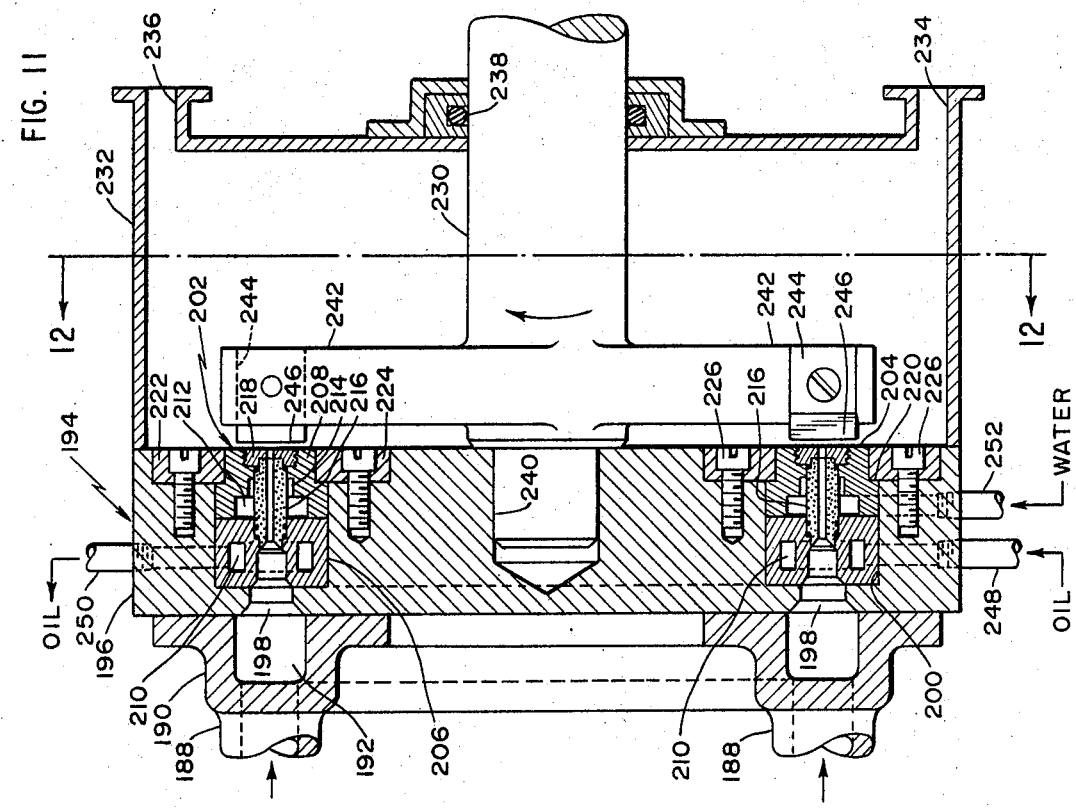
FIG. 11 is a sectional elevation of another embodiment of this invention.

Referring now to FIGS. 11 and 12, there is shown another embodiment of the invention in which the die face is flat rather than being cylindrical. Means 188 are provided for feeding a toroidal manifold structure 190 attached to die body 196 and enclosing a manifold 192. The feeding means may be, for example, a coupling plate such as that illustrated by numeral 18 in FIG. 1 and FIG. 2, and conduits 188 extending from the inlet of the coupling means to the manifold 190. This part of the description is purposely made somewhat schematic, because it is not part of the invention and is within the skill of the art to provide a suitable apparatus for feeding the manifold 190.

A die assembly is shown and is indicated generally by numeral 194, the assembly comprising the die body 196 in which are provided a plurality of extrusion bores 198 the axes of which are parallel to the axis of the die body itself and which communicate with manifold 192. A channel 200 is prpvided in the die body of such size as to receive a die ring indicated generally by numeral 202. The cross-sectional structure illustrated for die ring 202 is somewhat like that shown for the extrusion die 38, except that in this instance the individual extrusion orifices are positioned so as to be parallel to the axis of the die body, with the exit face 204 of the die being perpendicular to the die body axis. As before, the die ring 202 is composite in structure, and is made of the two separate toroidal annuli 206 and 208. The torus 206 is made in composite form, for example, following the general idea of section 64 of the first embodiment, thus to provide the heating oil manifolds or channels 210. The outer part 208 of the die ring is provided with the circular channel 212 which communicates with the individual enlarged outer bores 214 which surround the individual extrusion sleeves 216. Each of the extrusion sleeves is fastened into its respective bore in the composite die ring 202 by means of the plugs 218 and suitable shoulders and sealing means just as in the first embodiment. The bores in the rings 206 and 208 are coaxial not only with each other, but with the initial extrusion bores 198. The entire die ring as thus assembled are welded together, is locked into the die body by means of shoulders 220 provided on the periphery of part 208, and locking annuli 222 and 224 which are fitted into place in a suitable circular recess provided in the right-hand face (as viewed in FIG. 11) of the die body so as to engage the shoulders 220. Thus, by means of locking screws or bolts 226 the die ring is securely locked into the die body. It will thus be apparent that with this embodiment, a flow of fluid plastic through the die plate is coaxial in direction with the axis of the die itself, and thus is coaxial with the drive shaft for the cutting mechanism which will now be described.

A drive shaft 230 is provided, which is driven by suitable motor means (not shown). The drive shaft enters through the right-hand end of the casing 232 having an inlet 234 and outlet 236 for a fluid bath such as water. A seal 238 is provided of conventional nature where the shaft enters the closure at the right-hand end of casing 232. The drive shaft 230 terminates in a suitable bearing 240 in the body of the die. Mounted on the drive shaft 230 are a pair of knife arms 242, for example, it being realized that instead of having individual arms a circular cup-shaped plate such as circular plate 149 of the FIG. 2 embodiment may be used.

At the extremities of the knife arms 242 there are mounted holders 244 for the knives 246. As in the FIG. 2 embodiment, the knives are made adjustable using conventional means, and again it will be noted that the knife edges do not bear against the die face 204. As in the FIG. 2 embodiment, wear on the face of the die ring is thus avoided.

Hot oil inlets and outlets 248 and 250 are indicated in FIG. 11. By this means, hot oil is passed through the manifolds 210 to keep the entrance portion of the extrusion orifices hot. A water inlet 252 is provided which communicates with the manifold 212 and the counter bores 214 in order to surround the individual sleeves 216 with a fluid which can pass through these sleeves. Water is the preferred fluid, the latter being at about 800 lbs. per square inch pressure or thereabouts.

The operation of this device is basically the same as that shown in FIG. 2 with the exception that in this embodiment a flat die face is used instead of a cylindrical die face as in the FIG. 2 embodiment.

The operation of the apparatus and the method of pelletizing plastic therewith are as follows, reference being to the FIG. 5 embodiment. (The operation will be for polypropylene since this plastic is one of the difficult ones to pelletize on conventional pelletizers).

The polypropylene to be pelletized is put into hopper 4 and is heated in its passage through extruder 2. From the extruder it enters the adaptor and flows by the channels 56 to the manifold 58. As the polypropylene emerges from the extruder it is preferably at a temperature of appoximately 425° F. (The adaptor 52 will have been heated by the flow of heating oil or other medium at a temperature of 475°–500° F. through suitable manifolds in the adaptor.) After the viscous plastic reaches manifold 58, extrusion is continued until the plastic enters the extrusion bores 82, and passes through the extrusion sleeves 110, and emerges from the die face 154 of the apparatus. The die 38 is maintained in heated condition by the passage of the heating oil through the manifolds 80.

It will be noted that at the start up, the adaptor 52 and die 38 are first heated, and the plastic is extruded through the die. No water as yet has been forced into the manifold 98.

After the plastic is extruding satisfactorily through the bushings or sleeves 110 which have been heated by the temperature of the adaptor 52 as well as the heating fluid in the manifolds 80, water is then introduced at 800 lbs. per square inch pressure into manifold 98, (this having been found suitable for polypropylene) which solidifies at least the surface of the plastic. Drive shaft 20 is now rotated at approximately 800 rpm to move the knives around the face 154 of the extrusion die 38. At the same time, water is being introduced at conventional pressure (such as 100 lbs per square inch) into the pipe 24 which will flow through the bore 145, through the holes 254, between the spacing 190 and across the face of the die. This will further chill the plastic, thus facilitating the proper pelletizing thereof. At the same time, the in-flow of water will fill the casing 16, and as it emerges via outlet pipe 26, it carries with it the pellets of plastic.

The combined water and pellets are then processed to separate them, and the pellets are transferred to a drying chamber, while the water is then returned to the case 16 via the pipe 24, a suitable type of water pump being provided for this purpose.

This pelletizing operation is continued so long as plastic is being supplied from the extruder to the adaptor 52 and to the die 38.

It is believed that when the plastic enters the orifices for extrusion, it will be at approximately 425° F. There may be a small temperature drop from the plastic temperature of 425° at the entrance to the adaptor, but this loss will not be substantial, and it can be corrected by regulating the temperature of the heating medium in the adaptor and in the manifolds 80.

Other parameters which have worked successfully for polypropylene are as follows: the inlet water temperature used in the manifold 98 may be approximately 80° F. The water pressure of 800 lbs. per square inch has been found to work satisfactorily with polypropylene which is being extruded at a temperature of approximately 400°–425° F. The water in the casing 16 can be at an approximate temperature of 80° F. The knives may be rotated at approximately 800 rpm, but this can be varied somewhat since the speed is not critical. While not shown in the drawings, the speed of 800 rpm may be obtained by suitable gear reduction unit which in turn is driven by a conventional motor.

It will also be noted that because the plastic is first extruded through the orifices without any water being present in the manifold 98, the entire die is permitted to heat up to a proper extrusion temperature for the plastic. Once this point has been reached, then the introduction of water in the manifold 98 will not be sufficient to cool the extrusion die to the point the plastic will not flow therethrough. As indicated above, what seems to happen is that the outer surface of the plastic within the extrusion sleeves 110 becomes chilled while being extruded, and a solidified wall forms around what seems to be a much softer central core. In addition, it seems that water lies between the inner wall of the extrusion sleeves and the plastic, thus lubricating the passage of the latter therethrough.

While the operation thus described has been directed particularly to the FIGS. 1–5 embodiment, the embodiments shown in 6 and 11–12 operate in the same manner, the apparatus of FIG. 6 being the same as that of FIG. 5 except that the sleeves 122 are permanently fastened in place. As to the FIGS. 11–12 embodiment, the hot viscous plastic is conducted from the extruder through the conduits 188 and into the manifold 192 from which it enters die 194. Hot oil or other suitable medium is passed through the manifolds 210 in order to keep the die hot, and therefore to keep the plastic in its fluid state. The start up of the FIGS. 11–12 apparatus is the same as described above for the former embodiments, and from the former description it will be obvious how this latter embodiment is thereafter operated. The hot plastic is extruded completely through the sleeves 216 until the extrusion is taking place properly for the particular plastic, and thereafter the cooling liquid is introduced into the manifold to pass through the walls of the sleeves to the interior extrusion bores thereof, with resulting formation of the hardened or solidified plastic outer wall on the plastic being extruded. At the time that the water is introduced into the manifold 212, the knives 246 of this embodiment are rotated to pelletize the plastic as it extrudes. Cooling and conveying water is introduced into casing 232 via inlet 234, which passes across the die face to emerge through the outlet 236 carrying the pellets with it to the proper separation medium.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could by made in the above constructions without departing from the scope of the invention, it is intended that all matter contained in the above description or shown in the accompanying drawings, shall be interpreted as illustrative and not in a limiting sence, and it is also intended that the appended claims shall cover all such equivalent variations as come within the true spirit and scope of the invention.

Having described the invention, what is claimed is:

1. A die-type pelletizing apparatus for synthetic plastic comprising:
   a base;
   a die adaptor mounted on the base and having inlet and outlet portions;
   an extrusion die mounted on the outlet portion of said adaptor and having inner and outer die faces;
   conducting means in the adaptor for conducting hot plastic from the inlet portion thereof to the extrusion die;
   a plurality of extrusion bores in said extrusion die extending between the latter's inner and outer faces;
   bushings having walls pervious to a liquid and mounted in said bores, each bushing having an extrusion passage therethrough;
   first means for supplying a cooling liquid to at least a portion of the outer surface of said bushings within said extrusion bores thereby to cause the liquid to pass through said bushings into the extrusion passages thereof to engage the surface of plastic being extruded through the bushings; and
   cutting means movably mounted adjacent said outer die face for severing extruded plastic material as it emerges from said extrusion passages, thereby to pelletize said material.

2. The apparatus of claim 1 in which said first means is adapted to receive said liquid at a pressure greater than the plastic being extruded through the extrusion passageways.

3. The apparatus of claim 1 including third means for heating an inner portion of the length of each bushing adjacent the outlet portion of said adaptor.

4. The apparatus of claim 1 including a casing, closure means for the casing at one end thereof, and said adaptor comprising a closure means for the other end of the casing, the pellets when cut from the plastic falling into said casing.

5. The apparatus of claim 1, in which said bushings are detachably fastened into said extrusion bores.

6. The apparatus of claim 3, in which said third means comprises a pair of fluid receiving channels one on each side of the inner ends of said extrusion bores, the channels being interconnected between the bores, and said inner portions of the lengths of the bushings being in thermal conductivity with the die body portions forming the inner ends of the extrusion bores.

7. The apparatus of claim 1 in which said first means comprises a channel in said extrusion die surrounding said portion of each of said bushings, the channel having inlet means whereby said fluid may be introduced into the channel in order to surround each bushing with said fluid.

8. The apparatus of claim 1 in which said cutting means comprises at least one knife which traverses the outer face of the extrusion die as the knife moves, and including drive means to move the knife.

9. The apparatus of claim 8, in which said knife does not touch the external face of the extrusion die but is closely adjacent thereto.

10. The apparatus of claim 6, in which said channels include inlet and outlet means.

11. An extrusion die assembly for pelletizing plastic, including:
    a die member having a compression face and an expansion face;
    a plurality of extrusion bores in said die member extending between said faces;
    bushings having walls pervious to a liquid and mounted in said extrusion bores, each bushing having an extrusion passageway therethrough;
    first means for supplying a cooling liquid to the outer surface of said bushings within said extrusion bores thereby to cause the liquid to pass through said bushings into the extrusion passageways thereof to engage the surface of plastic being extruded through said bushings; and
    cutting means movably mounted adjacent the expansion face of the die member for severing extruded plastic material as it emerges from said extrusion passageways, thereby to pelletize said material.

12. The extrusion die of claim 11 in which said first means is adapted to receive said liquid at a pressure greater than the plastic being extruded through the extrusion passageways.

13. The die assembly of claim 11, including third means for heating an inner portion of the length of each bushing adjacent said compression face.

14. The die assembly of claim 11, in which said bushings are detachably fastened into said extrusion bores.

15. The die assembly of claim 11, in which said first means comprises a channel in the extrusion die enveloping said bushings, and having an inlet thereto for receiving said fluid.

16. The die assembly of claim 13, in which said third means comprises a pair of fluid receiving channels one on each side of said extrusion bores and in proximity to said compression face, the channels being interconnected between the bores, and said inner portions of the lengths of said bushings being in thermal conductivity with the die body portions forming the inner end portions of said extrusion bores.

17. The die assembly of claim 13, including inlet and outlet means for the channels, adapted to introduce and remove a hot heating fluid from said channels.

18. The die assembly of claim 15, including fluid receiving inlet means for said channel.

19. The die assembly of claim 11 in which the expansion face of the extrusion die is cylindrical and said bores extend radially with respect to the cylindrical face.

20. The die assembly of claim 11 in which the expansion face of the extrusion die is planar, and said bores are perpendicular to the expansion face.

21. The die assembly of claim 19 in which said bushings are detachably fastened into the extrusion bores.

22. The die assembly of claim 20 in which the bushings are detachably fastened into the extrusion bores.

* * * * *